(12) United States Patent
Schillings

(10) Patent No.: US 9,367,355 B1
(45) Date of Patent: Jun. 14, 2016

(54) RESOURCE UTILIZATION BY ONE OR MORE TASKS

(71) Applicant: Yahoo!, Inc., Sunnyvale, CA (US)

(72) Inventor: Benoit Schillings, Los Altos Hills, CA (US)

(73) Assignee: YAHOO!, INC., Sunnyvale, CA (US)

( * ) Notice: Subject to any disclaimer, the term of this patent is extended or adjusted under 35 U.S.C. 154(b) by 0 days.

(21) Appl. No.: 14/607,499

(22) Filed: Jan. 28, 2015

(51) Int. Cl.
*G06F 9/50* (2006.01)
*G06F 9/48* (2006.01)

(52) U.S. Cl.
CPC ............ *G06F 9/5011* (2013.01); *G06F 9/4881* (2013.01)

(58) Field of Classification Search
CPC .................................................. G06F 9/5011
See application file for complete search history.

(56) References Cited

U.S. PATENT DOCUMENTS

2015/0347186 A1* 12/2015 Truong ................. G06F 9/4887 718/103

OTHER PUBLICATIONS

Misha Dragojevic, Measuring server load with collectd, Jun. 14, 2010.*

* cited by examiner

*Primary Examiner* — Emerson Puente
*Assistant Examiner* — Charlie Sun
(74) *Attorney, Agent, or Firm* — Cooper Legal Group, LLC

(57) ABSTRACT

Complex devices, software systems, and/or networks may comprise one or more subsystems that perform periodic tasks. A first task may be assigned a first execution frequency and a second task may be assigned a second execution frequency that is not an alias of the first execution frequency (e.g., assignment of execution intervals that are non-overlapping harmonics of each other, such as non-repeating frequencies). A first resource utilization by the first task may be distinguished from a second resource utilization of the second task based upon the first resource utilization corresponding to resource utilization (e.g., network usage, processor usage, power consumption, user access, etc.) associated with the first execution frequency and the second resource utilization corresponding to resource utilization associated with the second execution frequency. Thus, resource utilization of individual tasks of various subsystems and/or networks may be determined.

20 Claims, 8 Drawing Sheets

RESOURCE UTILIZATION BY ONE OR MORE TASKS

BACKGROUND

Complex devices, software systems, and/or networks may comprise subsystems that perform periodic tasks (e.g., checking for emails, social network updates, software updates, device location information, etc.). Identifying a performance impact of a particular subsystem on a computing device may be relatively difficult to determine due to the complexity of subsystems of the computing device and/or overlapping execution of periodic tasks (e.g., an email checking task and a software update checking task may concurrently execute and utilize bandwidth, and thus individual bandwidth utilization by the respective tasks may be indistinguishable from each other). In an example, a mobile phone may concurrently execute a new email check task, a software update check task, and a debugging task, which may result in an inability to distinguish between resource utilization by respective tasks, such as for the purpose of identifying a task that has a more significant impact and/or usage of resources (e.g., network usage, power usage, etc.) than the other tasks.

SUMMARY

In accordance with the present disclosure, one or more systems and/or methods for determining resource utilization by one or more tasks are provided. Determining resource utilization by one or more tasks may comprise assigning a first execution frequency to a first task (e.g., a location identification task, a new message checking task, a social network alert task, a game alert, etc.) of a client device. In an example, a second execution frequency may be assigned to a second task of the client device. In another example, the second execution frequency may be assigned to the second task of a second client device where the first task and the second task both utilize similar resources, such as bandwidth of the same network or email services of an email service provider. The first execution frequency may comprise a first frequency that is not an alias of the second execution frequency (e.g., non-harmonic frequencies, non-repeating and overlapping frequencies, frequencies that have at least some non-overlapping execution timeframes, prime numbers, etc.).

A first resource utilization of the first task may be distinguished from a second resource utilization of the second task based upon the first resource utilization corresponding to resource utilization (e.g., network usage, processor usage, power consumption, user access, etc.) associated with the first execution frequency and the second resource utilization corresponding to resource utilization associated with the second execution frequency.

The first resource utilization and the second first resource utilization may be identified by performing a frequency-based evaluation upon resource utilization data. A fast Fourier transform or discrete Fourier transform may be used to identify a first frequency spectrum peak and/or a second frequency spectrum peak. The first frequency spectrum peak may be indicative of the first resource utilization and the second frequency spectrum peak may be indicative of the second resource utilization.

The first task, but not the second task, may be determined to exceed a resource consumption threshold based upon the first resource utilization and the second resource utilization. The first execution frequency may be altered responsive to the first task exceeding the resource consumption threshold

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
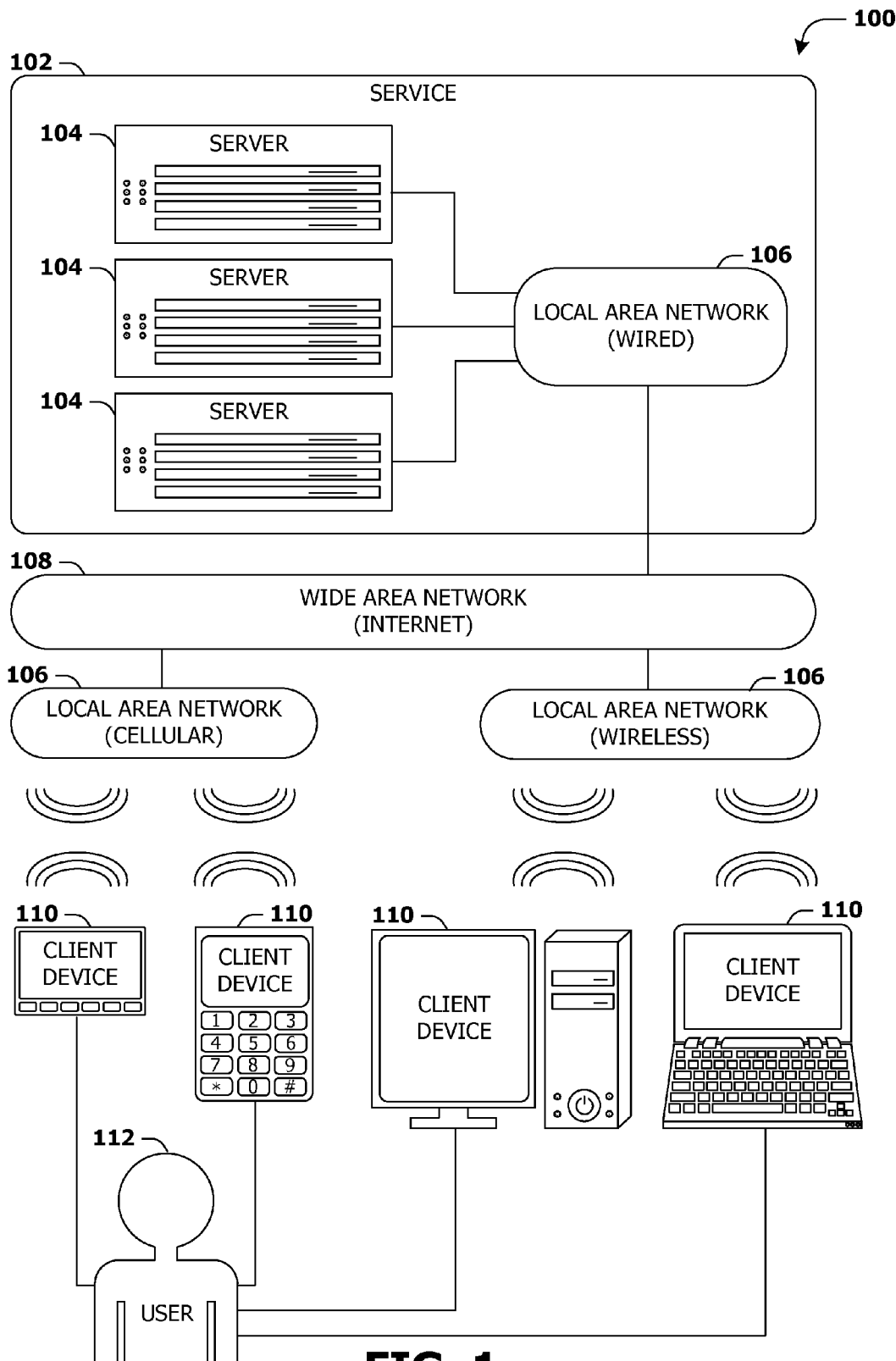
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
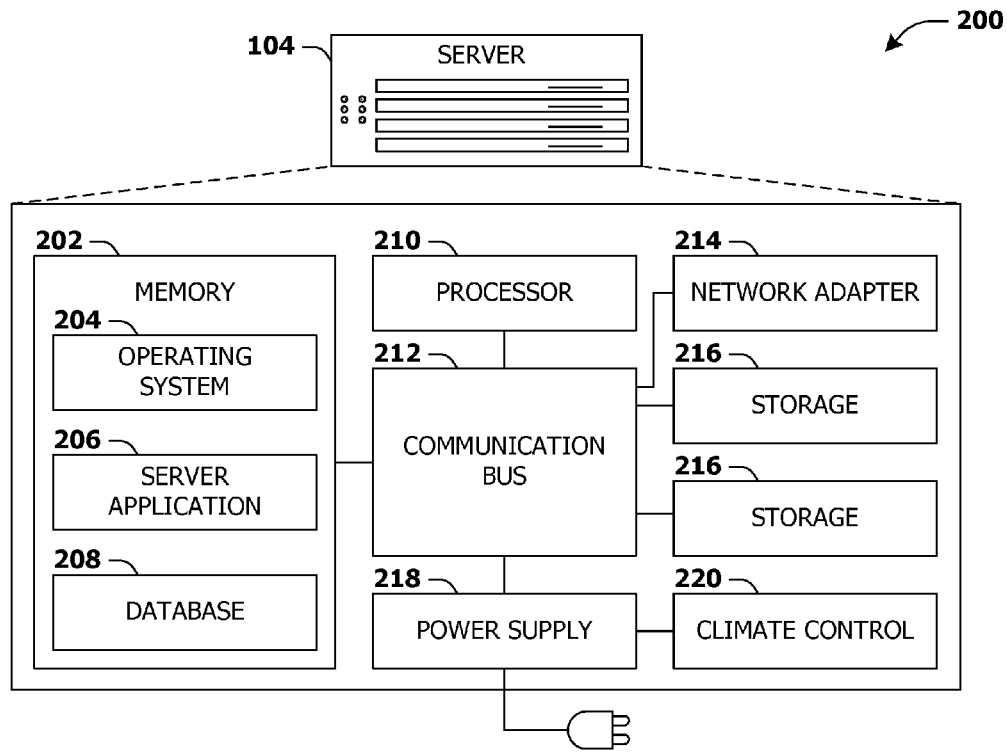
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
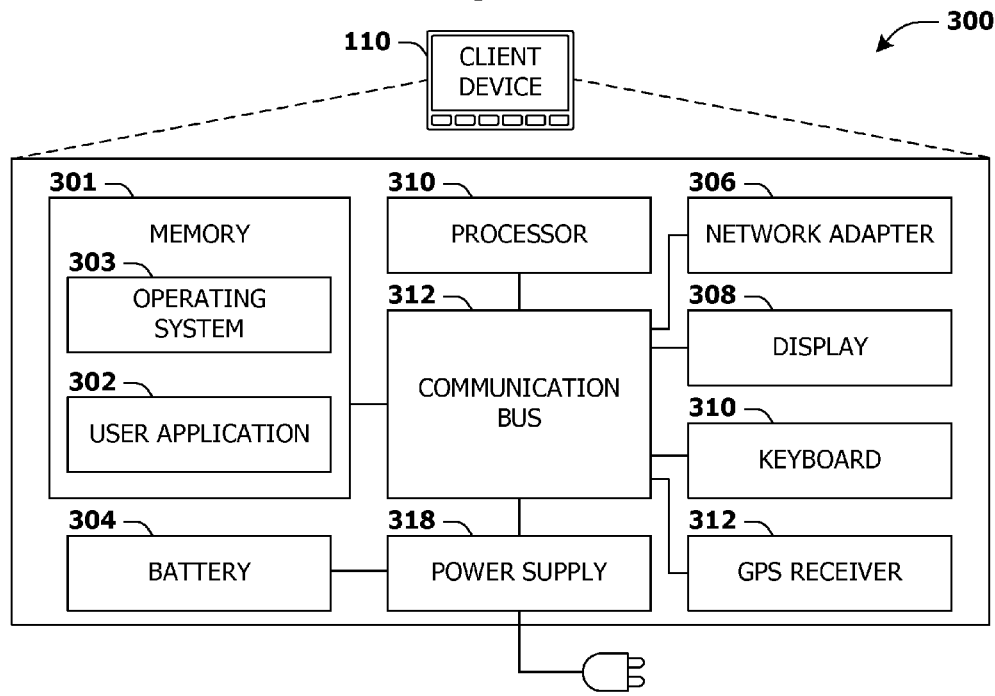
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for determining resource utilization by one or more tasks are presented herein. A client device, a network, and/or service provider may utilize several applications and/or subsystems to perform tasks. By assigning a first execution frequency to a first task and a second execution frequency (e.g., that is not an alias of the first execution frequency) to a second task, a first resource utilization of the first task may be distinguished from a second resource utilization of the second task.

The ability to distinguish between resource utilization of individual tasks may yield information used to modify tasks, subsystems, and/or service providers in order to reduce network bandwidth and/or computing resources otherwise inefficiently utilized by tasks such as due to performance bottlenecks (e.g., tasks that utilize relatively more resources may be performed in series as opposed to concurrently, which may reduce resource consumption spikes, slowdowns, and/or overburdening of a system, network, client device, service provider, etc.). Many service providers may not have information, processing resources, and/or network bandwidth to distinguish between resource utilization of tasks.

Figure 4:
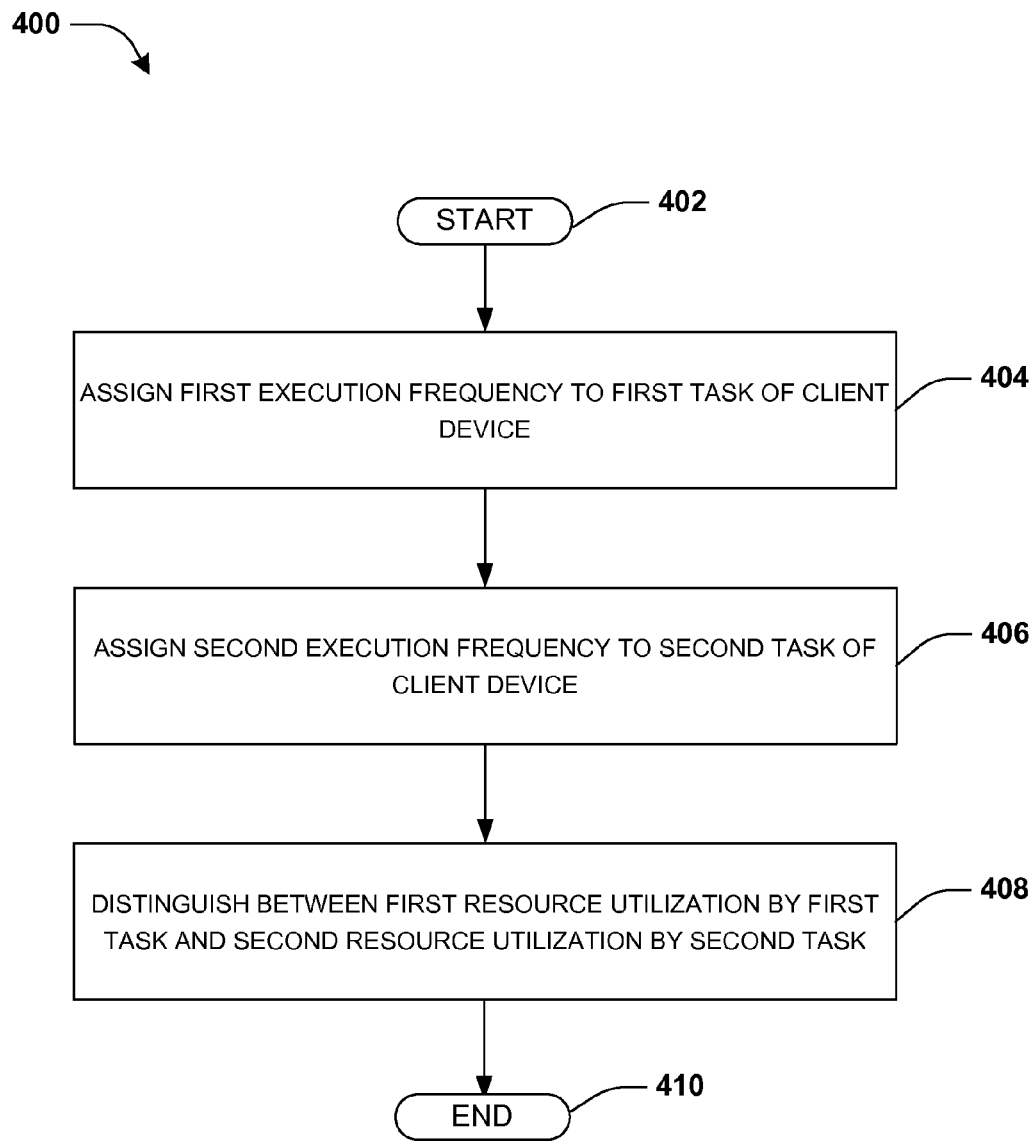
FIG. 4 is a flow chart illustrating an example method of determining resource utilization by one or more tasks.

An embodiment of determining resource utilization by one or more tasks is illustrated by an example method 400 of FIG. 4. At 402, the method 400 starts. At 404, a first execution frequency may be assigned to a first task of a client device (e.g., a new message checking task of an office productivity suite, which may access an office productivity server for new message notifications). The first execution frequency may comprise a series of time points at which the first task may be executed (e.g., the first task may be executed at 3 second intervals).

At 406, a second execution frequency may be assigned to a second task of the client device (e.g., a software update task of the office productivity suite, which may access the office productivity server for software updates) or of a second client device (e.g., a second instance of the new message checking task) such as where the first task and the second task utilize a similar resource (e.g., the client device and the second client device are connected to the same network; the first task and the second task both access the office productivity server; etc.). The first task and/or the second task may comprise a repeated task (e.g., a location identification task, the new message checking task, a social network alert task, a game alert task, the software update task, etc.). The first execution frequency may comprise a first frequency that is not an alias of the second execution frequency (e.g., frequencies where at least some execution events of the first task may not overlap with execution events of the second task so that resource utilization during execution of the first task may be distinguishable from resource utilization during execution of the second task). In an example, the first execution frequency and/or the second execution frequency may comprise prime numbers (e.g., numbers that are devisable by merely one and themselves), non-harmonic frequencies, non-overlapping frequencies, etc. (e.g., periodicity of 19 seconds, periodicity of 53 seconds, periodicity of 127 seconds, periodicity of 593 seconds, etc.).

The user may take affirmative action, such as providing opt-in consent, to allow access to and/or use of client device task execution and resource utilization information, such as for the purpose of distinguishing between resource utilization of the first task and the second task.

At 408, a first resource utilization of the first task may be distinguished from a second resource utilization of the second task. The first resource utilization (e.g., processor utilization, network bandwidth utilization, memory utilization, power consumption, user access, etc. of the client device, the network, the service provider, etc.) may correspond to resource utilization associated with the first execution frequency. The second resource utilization (e.g., of the client device, the second client device, the network, the service provider, etc.) may correspond to resource utilization associated with the second execution frequency.

The first resource utilization and/or the second resource utilization may be identified by performing a frequency-based evaluation (e.g., evaluation of resource consumption within a frequency domain). The frequency-based evaluation may be based upon identifying a first frequency spectrum peak indicative of the first resource utilization of the first task and/or identifying a second frequency spectrum peak indicative of the second resource utilization of the second task. Fast Fourier transform and/or discrete Fourier transform may be utilized to identify the first frequency spectrum peak and/or the second frequency spectrum peak. In an example, if the first task is performed at a frequency of 43 seconds, then frequency spectrum peaks at intervals of 43 seconds (e.g., at 43 seconds, 86 seconds, 129 seconds, etc.) may be correlated to the resource utilization of the first task. If the second task is performed at a frequency of 47 seconds, then frequency spectrum peaks at intervals of 47 seconds (e.g., 47 seconds, 94 seconds, 141 seconds, etc.) may be correlated to the resource utilization of the second task.

In an example, the first task, but not the second task, may exceed a resource consumption threshold. The resource consumption threshold may comprise an amount of resources (e.g., bandwidth consumption, power consumption, etc.) that may be anticipated for a particular task, and thus utilization over the resource consumption threshold may result in bottlenecks, system slowdowns, etc.

The resource access may be modified based upon the first resource utilization and/or the second resource utilization exceeding the resource consumption threshold (e.g., the first task and/or the second task may be allotted more or less processing resources, bandwidth, etc.; execution of the first task and/or the second task may be throttled by increasing or decreasing the first execution frequency and/or the second execution frequency; etc.). In an example, if a duration of an execution of the first task overlaps a duration of an execution of the second task, then the first execution frequency may be altered relative to the second execution frequency in order to mitigate instances of overlap between the first resource utilization and the second resource utilization (e.g., mitigate instance of execution overlap) so that the first resource utilization may be distinguishable from the second resource utilization and/or to reduce concurrent resource consumption since merely a one task may be executing at a point in time. At 410, the method 400 ends.

Figure 5:
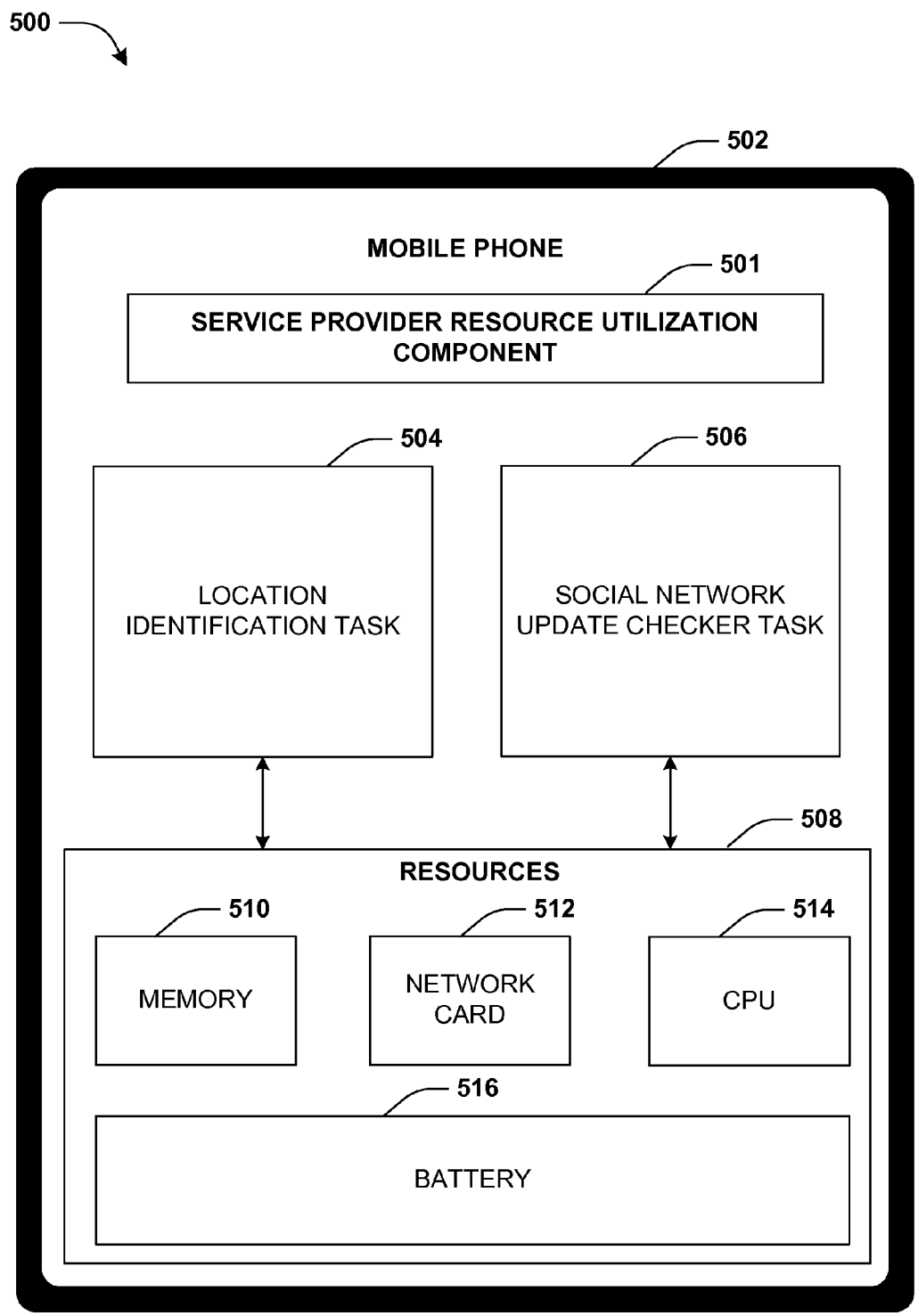
FIG. 5 is a component block diagram illustrating an example system, implemented for a mobile phone, for determining resource utilization by one or more tasks.

FIG. 5 illustrates an example of a system 500, implemented for a mobile phone 502, comprising a service provider resource utilization component 501 configured to evaluate resource usage by a location identification task 504 and a social network update checker task 506. The mobile phone 502 may comprise resources 508 such as memory 510, a network card 512, a CPU 514, and/or a battery 516. In an example, the location identification task 504 may be performed at a first execution frequency (e.g., at 53 second intervals) and the social network update checker task 506 may be performed at a second execution frequency (e.g., at 59 second intervals).

A first resource utilization of the location identification task 504 may be determined by identifying a first frequency spectrum peak at the first execution frequency (e.g., at 53 second intervals), by the service provider resource utilization component 501. A second resource utilization of the social network update checker task 506 may be determined by identifying a second frequency spectrum peak at the second execution frequency (e.g., at 59 second intervals), by the service provider resource utilization component 501. In an example, the larger an area under the first frequency spectrum peak, the greater the first resource utilization. The larger an area under the second frequency spectrum peak, the greater the second resource utilization. The first resource utilization and/or the second resource utilization may comprise power consumption (e.g., utilization of the battery 516), network usage by the network card 512, processing by the CPU 514, user access (e.g., user interactivity with an application that utilizes location information of the mobile phone 502 (e.g., execution of the location identification task 504), memory usage (e.g., utilization of the memory 510), etc.

In an example, the service provider resource utilization component 501 may determine that the second resource utilization of the social network update checker task 506 exceeds a resource consumption threshold. In an example, the service provider resource utilization component 501 may throttle execution of the social network update checker task 506 (e.g., by increasing or decreasing the second execution frequency so that the social network update checker task 506 does not create a bottleneck or to converse battery resources). In another example, the service provider resource utilization component 501 may send a notification to a social network application provider and/or a user that the social network update checker task 506 has a resource consumption problem.

Figure 6:
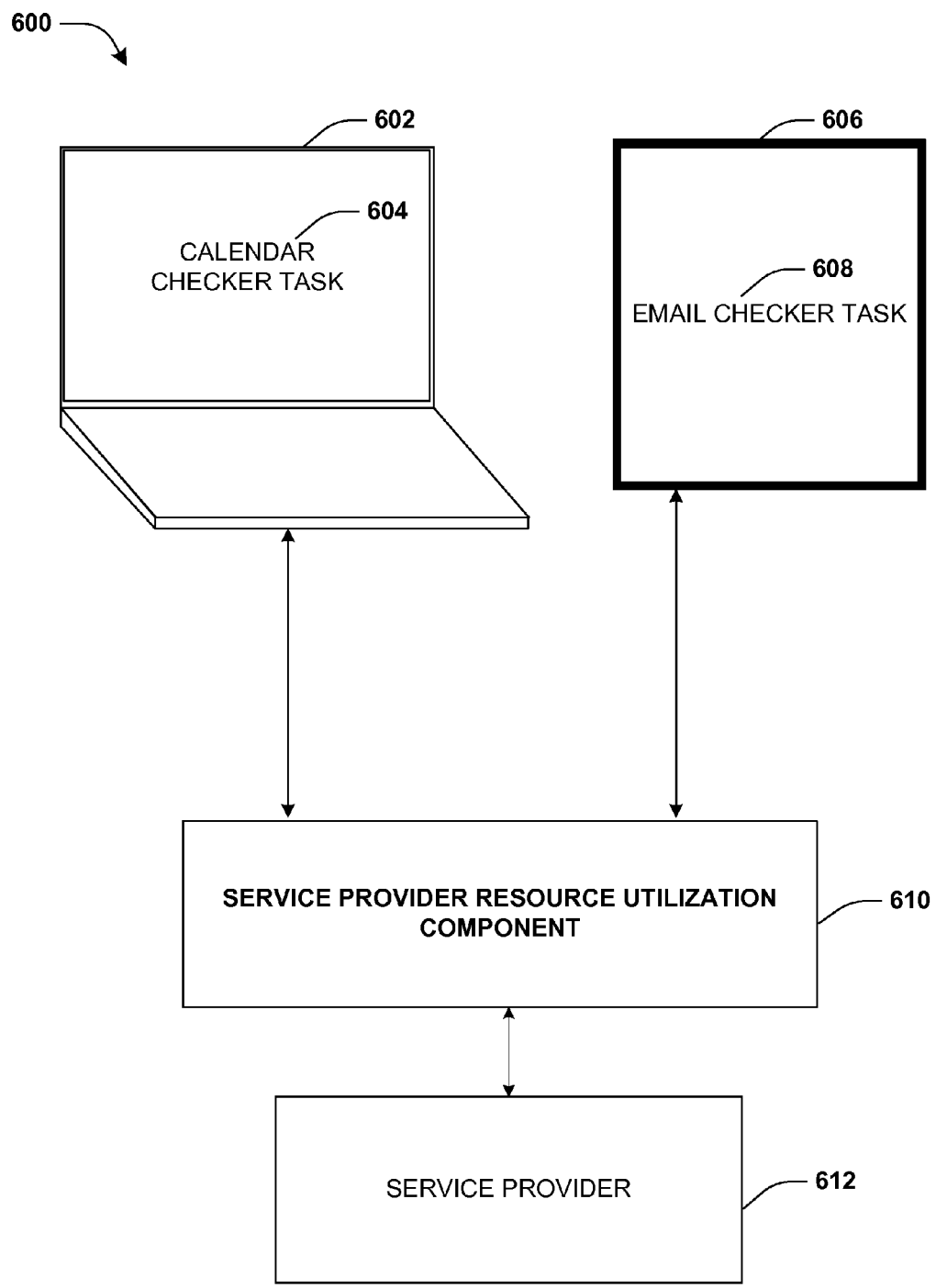
FIG. 6 is a component block diagram illustrating an example system, implemented for a service provider, for determining resource utilization by one or more tasks.

FIG. 6 illustrates an example of a system 600, implemented for a service provider 612 that provides services to a computer 602 that hosts a calendar checker task 604 and a tablet 606 that hosts an email checker task 608, comprising a service provider resource utilization component 610. The service provider resource utilization component 610 may be configured to determine a first execution frequency assigned to the calendar checker task 604 on the computer 602 and a second execution frequency assigned to the email checker task 608 on the tablet 606.

The service provider resource utilization component 610 may distinguish between a first resource utilization of the service provider 612 by the calendar checker task 604 and a second resource utilization of the service provider 612 by the email checker task 608. The service provider 612 may determine which tasks (e.g., the email checker task 608, the calendar checker task 604, etc.) utilize resources (e.g., network bandwidth, processing resources, etc.) and in what amount. The service provider 612 may use data about the first resource utilization and/or the second resource utilization to allocate and/or throttle access to service provider resources consumed by client devices (e.g., the computer 602, the tablet 606, etc.) and/or networks utilizing the service provider 612.

Figure 7:
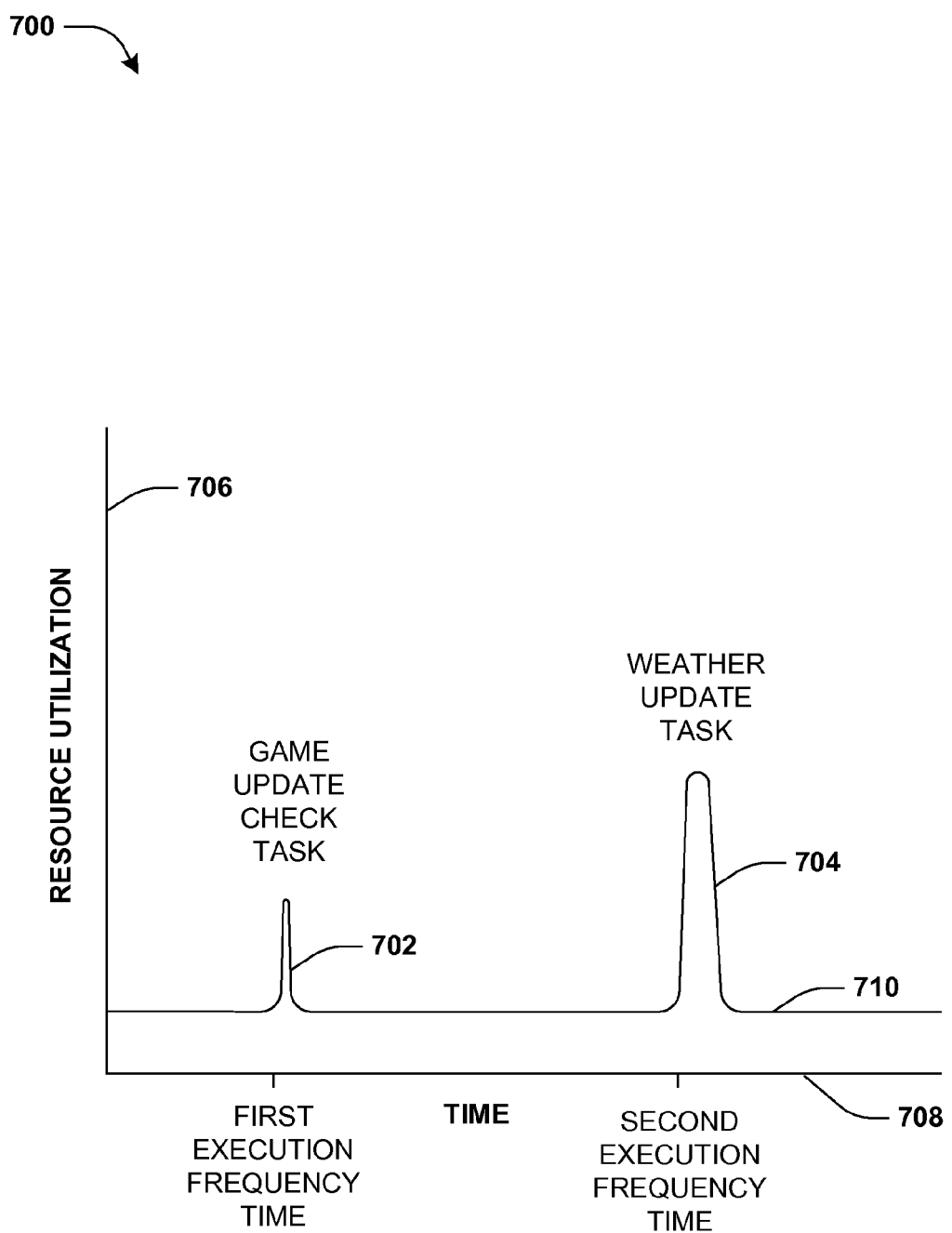
FIG. 7 is a graph illustrating an example frequency spectrum.

FIG. 7 illustrates an example of a graph 700 that represents resource utilization on a y-axis 706 and time on an x-axis 708. A frequency spectrum 710 may indicate resource utilization (e.g., resource utilization represented according to a time domain) such as at a first execution frequency time (e.g., 43 second intervals) and/or a second execution frequency time (e.g., 47 second intervals). A first execution frequency peak 702 in the frequency spectrum 710 at the first execution frequency time may be indicative of a first resource utilization of a first task (e.g., a game update check task). A second execution frequency peak 704 in the frequency spectrum 710 at the second execution frequency time may be indicative of a second resource utilization of a second task (e.g., a weather update task). In an example, the first execution frequency peak 702 has a smaller resource utilization peak value and/or area under the first execution frequency peak 702 than the second execution frequency peak 704, thus indicating that the game update check task utilizes less resources than the weather update task.

Figure 8A:
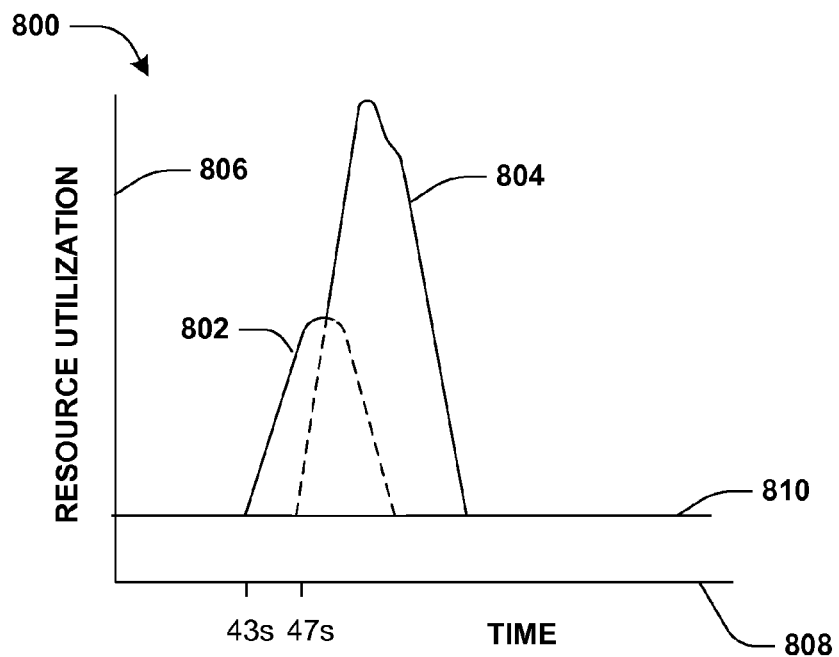
FIG. 8A is a graph illustrating an example frequency spectrum.
Figure 8B:
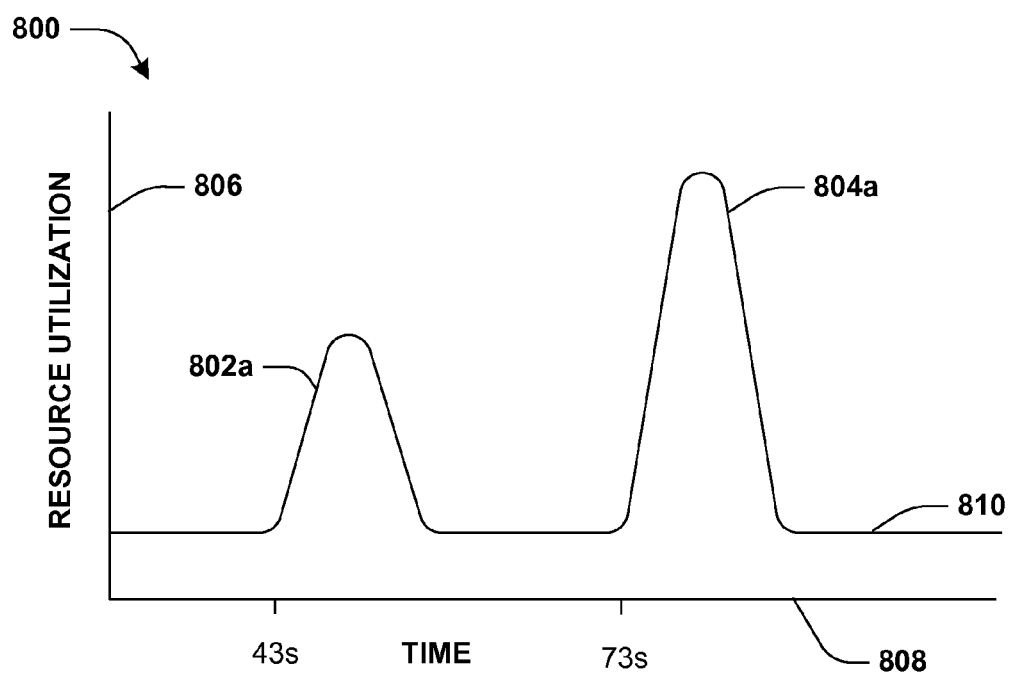
FIG. 8B is a graph illustrating an example altered frequency spectrum.

FIGS. 8A-8B illustrate examples of a graph 800 that represents resource utilization on a y-axis 806 and time in seconds on an x-axis 808. A frequency spectrum 810 may indicate resource utilization (e.g., resource utilization represented according to a time domain) such as at a first execution frequency time (e.g., 43 second intervals) and/or a second execution frequency time (e.g., 47 second intervals).

FIG. 8A illustrates the graph 800 comprising a first execution frequency peak 802, around 43 seconds (e.g., the first execution frequency time) indicative of a first resource utilization of a first task, that overlaps a second execution frequency peak 804 around 47 seconds (e.g., the second execution frequency time) indicative of a second resource utilization of a second task. In an example, the overlapping execution of the first task and the second task may result in inefficient resource consumption, which may result in bottlenecks, client device slowdowns, network access slowdowns, unresponsiveness of applications etc. In an example, the overlap may cause resource utilization to exceed a resource consumption threshold. Responsive to the first resource utilization and/or the second resource utilization exceeding the resource consumption threshold (e.g., during the overlapping execution), the first execution frequency and/or the second execution frequency may be altered relative to one another.

FIG. 8B illustrates the graph 800 illustrating an altered second execution frequency. The first execution frequency may remain the same (e.g., 43 second intervals) while the second execution frequency may be altered to the altered execution frequency (e.g., 73 second intervals). In an example, a new first execution frequency peak 802a may remain similar to the first execution frequency peak 802. However, a new second execution frequency peak 804a may occur at an altered time point, such as at a 73 second frequency. A degree to which the first execution frequency may be altered may be determined based upon the degree of the overlap (e.g., the greater the overlap the greater the degree of alteration).

Figure 9:
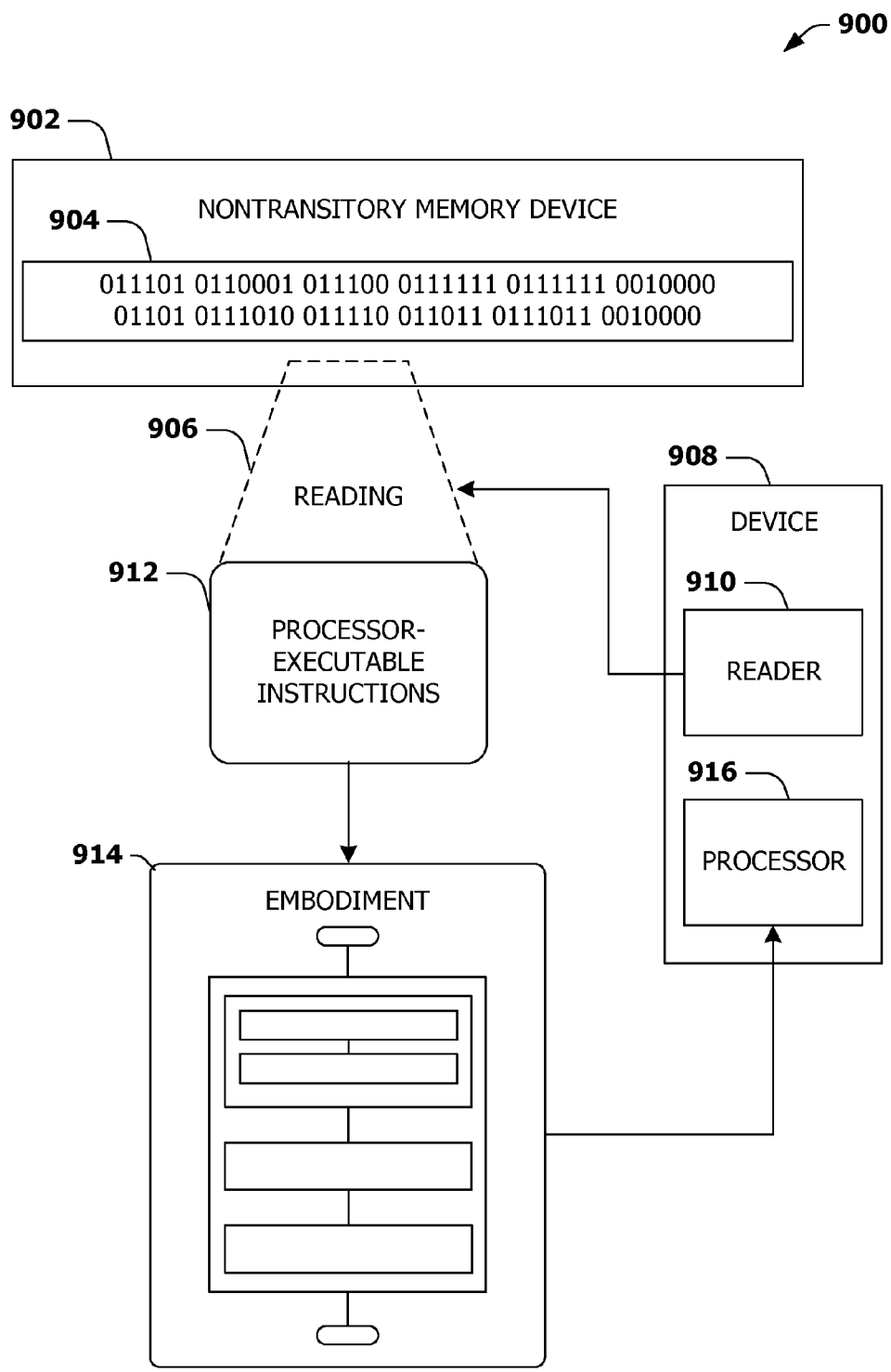
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 400 of FIG. 4, for example. In some embodiments, the processor-executable instructions, when executed on the processor 916 of the device 908, are configured to implement a system, such as at least some of the example system 500 of FIG. 5 and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a client device, will cause the client device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a client device, a first task at a first execution frequency;
   executing, on the client device, a second task at a second execution frequency, the first execution frequency comprising a first frequency that is not an alias of the second execution frequency;
   determining a first resource utilization by the first task and a second resource utilization by the second task based upon a first frequency spectrum peak indicative of the first resource utilization at the first execution frequency and a second frequency spectrum peak indicative of the second resource utilization at the second execution frequency;
   determining that the first task, but not the second task, is exceeding a resource consumption threshold based upon the first resource utilization and the second resource utilization; and
   modifying access to one or more resources for the first task, but not the second task, responsive to the first task, but not the second task, exceeding the resource consumption threshold.

2. The method of claim 1, the determining a first resource utilization by the first task and a second resource utilization by the second task comprising:
   performing a frequency-based evaluation upon resource utilization data to identify the first resource utilization and the second resource utilization.

3. The method of claim 1, the first frequency spectrum peak is different from the second frequency spectrum peak.

4. The method of claim 1, comprising:
   utilizing fast Fourier transform or discrete Fourier transform to identify at least one of the first frequency spectrum peak or the second frequency spectrum peak.

5. The method of claim 1, the first resource utilization and the second resource utilization corresponding to the client device.

6. The method of claim 1, the one or more resources comprising at least one of one or more processing resources, one or more network resources or one or more power resources.

7. The method of claim 1, comprising:
   modifying one or more tasks based upon the first resource utilization and the second resource utilization.

8. The method of claim 1, the first resource utilization corresponding to at least one of network usage, processor usage, power consumption, or user access.

9. The method of claim 1, the first task comprising at least one of a location identification task, a new message checking task, a social network alert task, or a game alert task.

10. The method of claim 1, comprising:
    altering the first execution frequency.

11. A system, comprising:
    a resource utilization component configured to:
       determine a first execution frequency at which a first task is executed on a first client device;
       determine a second execution frequency at which a second task is executed on a second client device;
       determine a first resource utilization by the first task and a second resource utilization by the second task based upon a first frequency spectrum peak indicative of the first resource utilization at the first execution frequency and a second frequency spectrum peak indicative of the second resource utilization at the second execution frequency;
       determine that the first task, but not the second task, is exceeding a resource consumption threshold based upon the first resource utilization and the second resource utilization; and
       modify access to one or more resources for the first task, but not the second task, responsive to the first task, but not the second task, exceeding the resource consumption threshold.

12. The system of claim 11, the resource utilization component configured to:
    perform a frequency-based evaluation upon resource utilization data to identify the first resource utilization and the second resource utilization.

13. The system of claim 11, the
    first resource utilization and the second resource utilization are associated with a service provider.

14. The system of claim 11, the resource utilization component configured to:
    utilize fast Fourier transform or discrete Fourier transform to identify at least one of the first frequency spectrum peak or the second frequency spectrum peak.

15. The system of claim 11, the first resource utilization corresponding to resources utilized by the first client device and the second resource utilization corresponding to resources utilized by the second client device.

16. The system of claim 11, the resource utilization component configured to:
    modify one or more tasks based upon the first resource utilization and the second resource utilization.

17. The system of claim 11, the first execution frequency comprising a first frequency that is not an alias of the second execution frequency.

18. A non-transitory computer readable medium comprising computer executable instructions that when executed by a processor perform a method, comprising:
  executing a first task at a first execution frequency;
  executing a second task at a second execution frequency, the first execution frequency comprising a first frequency that is not an alias of the second execution frequency;
  determining a first resource utilization by the first task and a second resource utilization by the second task based upon a first frequency spectrum peak indicative of the first resource utilization at the first execution frequency and a second frequency spectrum peak indicative of the second resource utilization at the second execution frequency;
  determining that the first task, but not the second task, is exceeding a resource consumption threshold based upon the first resource utilization and the second resource utilization; and
  modifying access to one or more resources for the first task, but not the second task, responsive to the first task, but not the second task, exceeding the resource consumption threshold.

19. The computer readable medium of claim 18, the determining a first resource utilization by the first task and a second resource utilization by the second task comprising performing a frequency-based evaluation upon resource utilization to identify the first resource utilization and the second resource utilization.

20. The computer readable medium of claim 18, the first task is associated with a first client device and the second task is associated with at least one of the first client device or a second client device.

* * * * *